US012777547B2

(12) United States Patent
Laselva et al.

(10) Patent No.: US 12,777,547 B2
(45) Date of Patent: Oct. 27, 2026

(54) MECHANISM FOR CONFIGURED GRANT TRANSMISSION

(71) Applicant: NOKIA TECHNOLOGIES OY, Espoo (FI)

(72) Inventors: Daniela Laselva, Klarup (DK); Samuli Heikki Turtinen, Ii (FI); Jussi-Pekka Koskinen, Oulu (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 264 days.

(21) Appl. No.: 18/553,242

(22) PCT Filed: Mar. 30, 2021

(86) PCT No.: PCT/CN2021/084123

§ 371 (c)(1),
(2) Date: Sep. 29, 2023

(87) PCT Pub. No.: WO2022/204994

PCT Pub. Date: Oct. 6, 2022

(65) Prior Publication Data

US 2024/0188169 A1 Jun. 6, 2024

(51) Int. Cl.

*H04W 76/20* (2018.01)
*H04B 17/318* (2015.01)

(Continued)

(52) U.S. Cl.

CPC .......... *H04W 76/20* (2018.02); *H04B 17/328* (2023.05); *H04W 72/12* (2013.01); *H04W 74/0833* (2013.01); *H04W 74/0836* (2024.01)

(58) Field of Classification Search

CPC . H04W 76/20; H04W 72/12; H04W 74/0833; H04W 74/0836; H04W 56/001;

(Continued)

(56) References Cited

U.S. PATENT DOCUMENTS

2015/0250017 A1* 9/2015 Ingale .................. H04W 72/20 370/280
2018/0020365 A1 1/2018 Xiong et al.

(Continued)

FOREIGN PATENT DOCUMENTS

CN 104144524 A 11/2014
CN 108605313 A 9/2018

(Continued)

OTHER PUBLICATIONS

LG Electronics “CG Resource validity and MAC PDU rebuilding on SDT”, 3GPP R2-2100784, Jan. 25-Feb. 5, 2021 (Year: 2021).*

(Continued)

*Primary Examiner* — Chuong M Nguyen
(74) *Attorney, Agent, or Firm* — Alston & Bird LLP

(57) ABSTRACT

Mechanism on configured grant transmissions is provided. If a small data transmission is needed, a first device determines whether a timing advance is valid in a subsequent CG occasion for the small data transmission. The first device also determines whether an evaluation of a validity condition is applicable in the subsequent CG occasion for the small data transmission. If the timing advance is valid and the evaluation is applicable, the first device performs the small data transmission in the subsequent CG occasion. In this way, the first device is able to perform the evaluation of the validity condition in advance, thereby reducing delays and avoiding failures.

16 Claims, 8 Drawing Sheets

(51) Int. Cl.

| | |
|---|---|
| ***H04W 72/12*** | (2023.01) |
| ***H04W 74/0833*** | (2024.01) |
| ***H04W 74/0836*** | (2024.01) |

(58) Field of Classification Search

CPC ......... H04W 56/0045; H04W 72/1268; H04W 74/006; H04W 24/08; H04W 28/0221; H04W 74/002; H04B 17/328; Y02D 30/70

See application file for complete search history.

(56) References Cited

U.S. PATENT DOCUMENTS

| | | | | |
|---|---|---|---|---|
| 2018/0152907 | A1 | 5/2018 | Zhang et al. | |
| 2018/0192416 | A1 | 7/2018 | Yin et al. | |
| 2018/0367255 | A1 | 12/2018 | Jeon et al. | |
| 2018/0375614 | A1 | 12/2018 | Shimezawa | |
| 2019/0053319 | A1 | 2/2019 | Jeon et al. | |
| 2019/0246398 | A1 | 8/2019 | Chen et al. | |
| 2019/0261346 | A1 | 8/2019 | Jiang et al. | |
| 2019/0268965 | A1 | 8/2019 | Jang et al. | |
| 2020/0019664 | A1 | 1/2020 | Dutta et al. | |
| 2020/0092905 | A1 | 3/2020 | Vos et al. | |
| 2020/0107295 | A1 | 4/2020 | Lee et al. | |
| 2020/0107396 | A1 | 4/2020 | Wang et al. | |
| 2020/0196264 | A1 | 6/2020 | Shih et al. | |
| 2020/0322981 | A1 | 10/2020 | Choe et al. | |
| 2020/0337089 | A1 | 10/2020 | Ren | |
| 2020/0359409 | A1 | 11/2020 | Karaki et al. | |
| 2020/0383085 | A1 | 12/2020 | Shih | |
| 2020/0404648 | A1 | 12/2020 | Kim et al. | |
| 2021/0136831 | A1 | 5/2021 | Zhang et al. | |
| 2021/0274526 | A1 | 9/2021 | Shin et al. | |
| 2021/0345344 | A1 | 11/2021 | Sha et al. | |
| 2022/0022245 | A1 | 1/2022 | Dudda et al. | |
| 2022/0132445 | A1 | 4/2022 | Kim et al. | |
| 2022/0159604 | A1 | 5/2022 | Höglund et al. | |
| 2022/0393957 | A1* | 12/2022 | Wang | H04B 7/18508 |
| 2023/0388839 | A1 | 11/2023 | Lyazidi et al. | |
| 2023/0397298 | A1* | 12/2023 | Lin | H04W 56/0045 |
| 2024/0040626 | A1* | 2/2024 | Tseng | H04W 72/542 |

FOREIGN PATENT DOCUMENTS

| | | | |
|---|---|---|---|
| CN | 109548133 | A | 3/2019 |
| CN | 110177397 | A | 8/2019 |
| CN | 110769505 | A | 2/2020 |
| CN | 111800888 | A | 10/2020 |
| CN | 113287351 | A | 8/2021 |
| CO | 2019/008014 | A2 | 7/2019 |
| CO | 2021/009359 | A2 | 7/2021 |
| CO | 2023/006573 | A2 | 6/2023 |
| EP | 3614777 | | 2/2020 |
| EP | 3668263 | A1 | 6/2020 |
| EP | 3744143 | A1 | 12/2020 |
| EP | 3806555 | A1 | 4/2021 |
| EP | 3823384 | A1 | 5/2021 |
| EP | 3949599 | A1 | 2/2022 |
| EP | 3997923 | A1 | 5/2022 |
| EP | 4091388 | A1 | 11/2022 |
| EP | 4158995 | A1 | 4/2023 |
| EP | 4298863 | A1 | 1/2024 |
| EP | 4309464 | A1 | 1/2024 |
| WO | WO 2020/032629 | A1 | 2/2020 |
| WO | WO 2020/067790 | A1 | 4/2020 |
| WO | 2020/087325 | | 5/2020 |
| WO | 2020/167100 | A1 | 8/2020 |
| WO | WO 2021/197326 | A1 | 10/2021 |
| WO | WO 2021/259370 | A1 | 12/2021 |
| WO | WO 2022/197227 | A1 | 9/2022 |
| WO | WO 2022/197844 | A1 | 9/2022 |

OTHER PUBLICATIONS

LG Electronics 3GPP Contribution Document R2-2100784, entitled "CG Resource validity and MAC PDU rebuilding on SDT," (Year: 2021).*

"5G; NR; Requirements for support of radio resource management—3GPP TS 38.133 version 17.7.0 Release 17", ETSI TS 138 133 v17.7.0, (Oct. 2022), 3823 pages.

"5G; NR; User Equipment (UE) radio access capabilities—3GPP TS 38.306 version 16.4.0 Release 16", ETSI TS 138 306 v16.4.0, (Apr. 2021), 152 pages.

Agiwal, Anil, "Re: [External] Re: [AT113-e][509][SData] LS to RAN1 (Lenovo)", Listserv—3GPP_TSG_RAN_WG2 Archives, (Feb. 5, 2021 07:50:14), 6 pages.

Axmon, Joakim, "Re: [95e][201] NR_NewRAT_RRM_Core CR R4-2007783 Interruption windows", 3GPP_TSG_RAN_WG4 Archives, (Jun. 3, 2020 09:56:37), 9 pages.

CH Park, "Re: [95e][201] NR_NewRAT_RRM_Core CR R4-2007783 Interruption windows", 3GPP_TSG_RAN_WG4 Archives, (Jun. 2, 2020 20:02:01), 7 pages.

CH Park, "Re: [95e][201] NR_NewRAT_RRM_Core CR R4-2007783 Interruption windows", 3GPP_TSG_RAN_WG4 Archives, (Jun. 3, 2020 20:08:50), 10 pages.

CH Park, "Re: [95e][201] NR_NewRAT_RRM_Core CR R4-2007783 Interruption windows", 3GPP_TSG_RAN_WG4 Archives, (Jun. 3, 2020 20:80:50), 10 pages.

CH Park, "Re: [95e][201] NR_NewRAT_RRM_Core CR R4-2007783 Interruption windows", 3GPP_TAG_RAN_WG4 Archives, (Jun. 3, 2020 23:37:04), 12 pages.

CH Park, "Re: [95e][201] NR_NewRAT_RRM_Core CR R4-2007783 Interruption windows", 3GPP_TSG_RAN_WG4 Archives, (Jun. 4, 2020 00:33:09), 12 pages.

Daixizeng, "Re: [95e][201] NR_NewRAT_RRM_Core CR R4-2007783 Interruption windows", 3GPP_TSG_RAN_WG4 Archives, (Jun. 3, 2020 09:46:29), 8 pages.

Joakim Axmon, "Re: [95e][201] NR_NewRAT_RRM_Core CR R4-2007783 Interruption windows", 3GPP_TSG_RAN_WG4 Archives (Jun. 3, 2020 17:41:49), 10 pages.

Joakim Axmon, "Re: [95e][201] NR_NewRAT_RRM_Core CR R4-2007783 Interruption windows", 3GPP_TSG_RAN_WG4 Archives, (Jun. 3, 2020 20:21:28), 11 pages.

Joakim Axmon, "Re: [95e][201] NR_NewRAT_RRM_Core CR R4-2007783 Interruption windows", 3GPP_TSG_RAN_WG4 Archives, (Jun. 4, 2020 00:02:21), 12 pages.

Lin, Xue, "Re: [External] Re: [AT113-e][509][SData] LS to RAN1 (Lenovo)", 3GPP_TSG_RAN_WG2 Archives, (Feb. 5, 2021 02:08:25), 7 pages.

Lohr, Joachim, "[POST112-e][550][SDT] Further details of CG aspects (Lenovo)", 3GPP_TSG_RAN_WG2 Archives, (Dec. 4, 2020 16:40:02), 1 page.

Lohr, Joachim, "Re: [AT113-e][509][SData] LS to RAN1 (Lenovo)", Listserv—3GPP_TSG_RAN_WG2 Archives, (Feb. 5, 2021 04:34:56), 7 pages.

Lohr, Joachim, "Re: [External] [POST112-e][550][SDT] Further details of CG aspects (Lenovo)", 3GPP_TSG_RAN_WG2 Archives, (Jan. 11, 2021 18:43:57), 2 pages.

Lohr, Joachim, "Re: [External] [POST112-e][550][SDT] Further details of CG aspects (Lenovo)", 3GPP_TSG_RAN_WG2 Archives, (Jan. 13, 2021 16:31:25), 4 pages.

Lohr, Joachim, "Re: [External] Re: [AT113-e][509][SData] LS to RAN1 (Lenovo)", Listserv—3GPP_TSG_RAN_WG2 Archives, (Feb. 4, 2021 09:39:32), 4 pages.

Lohr, Joachim, "Re: [External] Re: [AT113-e][509][SData] LS to RAN1 (Lenovo)", Listserv—3GPP_TSG_RAN_WG2 Archives, (Feb. 4, 2021 09:47:46), 4 pages.

Lohr, Joachim, "Re: [External] Re: [AT113-e][509][SData] LS to RAN1 (Lenovo)", Listserv—3GPP_TSG_RAN_WG2 Archives, (Feb. 4, 2021, 12:57:51), 5 pages.

Lohr, Joachim, "Re: [External] Re: [AT113-e][509][SData] LS to RAN1 (Lenovo)", Listserv—3GPP_TSG_RAN_WG2 Archives, (Feb. 5, 2021, 05:31:39), 8 pages.

Office Action for ARIPO Application No. AP/P/2023/015198 dated Jun. 17, 2025, 4 pages.

(56) References Cited

OTHER PUBLICATIONS

Office Action for European Application No. 21933674.0 dated Jun. 13, 2025, 9 pages.
Palat, Sudeep K., "Re: [External] Re: [AT113-e][509][SData] LS to RAN1 (Lenovo)", 3GPP_TSG_RAN_WG2 Archives, (Feb. 4, 2021 21:48:02), 6 pages.
Pani, Diana, "Re: [External] Re: [AT113-e][509][SData] LS to RAN1 (Lenovo)", Listserv—3GPP_TSG_RAN_WG2 Archives, (Feb. 5, 2021, 13:35:24), 8 pages.
Vutukuri, Eswar, "Re: [External] Re: [AT113-e][509][SData] LS to RAN1 (Lenovo)", Listserv—3GPP_TSG_RAN_WG2 Archives, (Feb. 4, 2021 21:38:25), 5 pages.
Wu, Chunli, "Re: [External] Re: [AT113-e][509][SData] LS to RAN1 (Lenovo)", Listserv—3GPP_TSG_RAN_WG2 Archives, (Feb. 4, 2021 10:48:26), 4 pages.
Wu, Chunli, "Re: [External] Re: [AT113-e][509][SData] LS to RAN1 (Lenovo)", Listserv—3GPP_TSG_RAN_WG2 Archives, (Feb. 5, 2021 03:10:21 ), 7 pages.
Wu, Yumin, "Re: [AT113-e][509][SData] LS to RAN1 (Lenovo)", Listserv—3GPP_TSG_RAN_WG2 Archives, (Feb. 4, 2021 08:4 1:23), 4 pages.
Wu, Yumin, "Re: [AT113-e][509][SData] LS to RAN1 (Lenovo)", Listserv—3GPP_TSG_RAN_WG2 Archives, (Feb. 5, 2021 04:45:44), 8 pages.
Yi, SeungJune, "Re: [AT113-e][509][SData] LS to RAN1 (Lenovo)", Listserv—3GPP_TSG_RAN_WG2 Archives, (Feb. 4, 2021 09:26:31), 2 pages.
Yinghaoguo, "Re: [POST112-e][550][SDT] Further details of CG aspects (Lenovo)", 3GPP_TSG_RAN_WG2 Archives, (Dec. 9, 2020 02:37:05), 2 pages.
Zhangli (DK), "Re: [95e][201] NR_NewRAT_RRM_Core CR R4-2007783 Interruption windows", 3GPP_TSG_RAN_WG4 Archives, (Jun. 3, 2020 08:10:29), 8 pages.
Zhangli (DK), "Re: [95e][201] NR_NewRAT_RRM_Core CR R4-2007783 Interruption windows", 3GPP_TSG_RAN_WG4 Archives, (Jun. 3, 2020 22:52:03), 11 pages.
Zhangli (DK), "Re: [95e][201] NR_NewRAT_RRM_Core CR R4-2007783 Interruption windows", 3GPP_TSG_RAN_WG4 Archives, (Jun. 4, 2020 00:03:56), 12 pages.
"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 v16.4.0, (Mar. 2021), 142 pages.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.3.0, (Dec. 2020), 1084 pages.
"3rd Generation Partnership Project; Technical Specification Group Radio Access Network; Evolved Universal Terrestrial Radio Access (E-UTRA); Requirements for support of radio resource management (Release 17)", 3GPP TS 36.133 v17.0.0, (Dec. 2020), 91 pages.
"3rd Generation Partnership Project; Technical Specification Group Radio Access Network; NR; Medium Access Control (MAC) protocol specification (Release 16)", 3GPP TS 38.321 v16.3.0, (Dec. 2020), 156 pages.
"3rd Generation Partnership Project; Technical Specification Group Radio Access Network; NR; Radio Resource Control (RRC) protocol specification (Release 15)", 3GPP TS 38.331 v15.13.0, (Mar. 2021), 540 pages.
ASUSTek, "Discussion on TA timer for D-PUR", 3GPP TSG-RAN WG2 Meeting #105, R2-1901043, (Feb. 25-Mar. 1, 2019), 3 pages.
Catt, "Analysis on SDT Procedures using CG", 3GPP TSG-RAN WG2 Meeting #112 electronic, R2-2009369, (Nov. 2-13, 2020), 5 pages.
CMCC, "SDT type selection and switch procedure", 3GPP TSG-WG2 Meeting #112 electronic, R2-2010388, (Nov. 2-13, 2020), 4 pages.
Ericsson, "[ATT110-e][313] PUR open issues", 3GPP TSG-RAN WG2 Meeting #110, R2-2005936, (Jun. 1-12, 2020), 31 pages.
Ericsson, "Details of CG based SDT", 3GPP TSG-RAN WG2 #112e, R2-2009964, (Nov. 2-13, 2020), 4 pages.
Ericsson, "Email discussion summary for RAN4#94e_#70_LTE_eMTC5_RRM", 3GPP TSG-RAN WG4 Meeting #94-e, R4-2002295, (Feb. 24-Mar. 6, 2020), 35 pages.
Ericsson, "PUR TA validation & Release", 3GPP TSG-RAN WG2 #105bis, R2-1903831, (Apr. 8-12, 2019), 5 pages.
Ericsson, "Report on email discussion [106#60] D-PUR TA validation criteria", 3GPP TSG-RAN WG2 #107, R2-1910435, (Aug. 26-30, 2019), 27 pages.
Ericsson, "RRC-MAC interaction details and other FFSs for PUR in running MAC CR", 3GPP TSG-RAN WG2 Meeting #109-e, R2-2000985, (Feb. 24-Mar. 6, 2020), 5 pages.
Ericsson, "WF on Rel-16 MTC RRM requirements", 3GPP TSG-RAN WG4 Meeting #95-e, R4-2008645, (May 25-Jun. 5, 2020), 8 pages.
ETRI, "CG resource release for SDT", 3GPP TSG-RAN WG2 #113-e, R2-2101466, (Jan. 25-Feb. 5, 2021), 2 pages.
ETSI MCC, "Report of 3GPP TSG RAN WG2 meeting #113-e, Online", 3GPP TSG-RAN WG2 meeting #113bis-e, R2-2102601, (Jan. 25-Feb. 5, 2021), 101 pages.
Extended European Search Report for European Application No. 21933674.0 dated Dec. 16, 2024, 11 pages.
Fujitsu, "Open issue in [Post111-e][926]: TAT handling", 3GPP TSG-RAN WG2 Meeting #112-e, R2-2009131, (Nov. 2-13, 2020), 5 pages.
Huawei et al., "Control plane common aspects for SDT", 3GPP TSG-RAN WG2 #113-e, R2-2101184, (Jan. 25-Feb. 5, 2021), 10 pages.
Huawei et al., "CR for Tx timing requirements for PUR transmission", 3GPP TSG-RAN4 Meeting #92, Change Request CR 6625, R4-1910559, (Aug. 26-30, 2019), 3 pages.
Huawei et al., "CR on measurement requirements for RSRP change based TA validation", 3GPP TSG-RAN4 Meeting #94bis-e, R4-2004379, (Apr. 20-30, 2020), 2 pages.
Huawei et al., "CR on measurement requirements for RSRP change based TA validation", 3GPP TSG-RAN WG4 Meeting #94-e-Bis, R4-2004256, (Apr. 20-30, 2020), 2 pages.
Huawei et al., "Discussion on capturing RRM requirements for PUR in Rel-16 eMTC", 3GPP TSG-RAN WG4 Meeting #94bis-e, R4-2004378, (Apr. 20-30, 2020), 2 pages.
Huawei et al., "Discussion on interface selection", 3GPP TSG-RAN WG2 Meeting #105, R1-1902056, (Feb. 25-Mar. 1, 2019), 3 pages.
Huawei et al., "RRC-MAC interactions for PUR", 3GPP TSG-RAN WG2 Meeting #110-e, R2-2005020, (Jun. 1-12, 2020), 5 pages.
Huawei, "Introduction of additional enhancements for NB-IoT in TS 36.331", 3GPP TSG-RAN WG2 Meeting #109-e, R2-2001782, (Feb. 24-Mar. 6, 2020), 82 pages.
Huawei, "Introduction of additional enhancements for NB-IoT in TS 36.331", 3GPP TSG-RAN2 Meeting #108, R2-1915298, (Nov. 18-22, 2019), 130 pages.
Huawei, "Report NB-IoT breakout session", 3GPP TSG-RAN WG2 Meeting #109bis electronic, R2-2003807, (Apr. 20-30, 2020), 19 pages.
Huawei, "Report of email discussion [Post109e#46][NBIOT/EMTC] PUR open issues", 3GPP TSG-RAN WG2 Meeting #109bis-e, R2-2003746, (Apr. 20-30, 2020), 36 pages.
Intel Corporation, "Handling of Configured grant for SDT", 3GPP TSG RAN WG2 Meeting #112-e, R2-2008995, (Nov. 2-13, 2020), 4 pages.
Intel Corporation, "SDT control plane procedures and failure handling", 3GPP TSG-RAN WG2 Meeting #112-e, R2-2008993, (Nov. 2-13, 2020), 9 pages.
InterDigital, "CG-based SDT selection and configuration", 3GPP RAN WG2 Meeting #113-e, R2-2101506, (Jan. 25-Feb. 5, 2021), 4 pages.
InterDigital, "Configuration and selection of CG-based SDT resource", 3GPP RAN WG2 Meeting #112e, R2-2010107, (Nov. 2-13, 2020), 3 pages.
International Search Report and Written Opinion for Patent Cooperation Treaty Application No. PCT/CN2021/084123 dated Dec. 31, 2021, 9 pages.

(56) References Cited

OTHER PUBLICATIONS

Lenovo et al., "Consideration on CG based small data transmission", 3GPP TSG-RAN WG2 Meeting #113 electronic, R2-2101111, (Jan. 25-Feb. 5, 2021), 3 pages.
Lenovo, "Report from email discussion [POST112-e][550][SDT] Further details of CG aspects", 3GPP RAN WG2 Meeting #113e, R2-2100930, (Jan. 25-Feb. 5, 2021), 31 pages.
LG Electronics Inc., "CG Resource validity and MAC PDU rebuilding on SDT", 3GPP TSG-RAN2 #113-e, R2-2100784, (Jan. 25-Feb. 5, 2021), 2 pages.
LG Electronics Inc., "Coexistence of CG and RACH configuration for SDT", 3GPP TSG-RAN2 #112-e, R2-2009458, (Nov. 2-13, 2020), 2 pages.
LG Electronics Inc., "Discussion on Time Alignment Timer for PUR", 3GPP TSG-RAN WG2 Meeting #105, R2-1901881, (Feb. 25-Mar. 1, 2019), 2 pages.
LG Electronics, "Discussion on preconfigured UL resources in NB-IoT", 3GPP TSG RAN WG1 Meeting #94, R1-1808475, (Aug. 20-24, 2018), 5 pages.
NEC, "Discussion on CG-based Small Data Transmissions", 3GPP TSG-RAN WG2 Meeting #112 electronic, R2-2009973, (Nov. 2-13, 2020), 3 pages.
Nokia et al., "Aspects specific to CG based schemes", 3GPP TSG-RAN WG2 Meeting #113 Electronic, R2-2101147, (Jan. 25-Feb. 5, 2021), 5 pages.
Nokia et al., "Discussion on aspects specific to CG based SDT", 3GPP TSG-RAN WG2 Meeting #112 Electronic, R2-2009350, (Nov. 2-13, 2020), 5 pages.
Nokia et al., "Preconfigured Grant for Uplink transmission", 3GPP TSG RAN WG1 Meeting #94, R1-1808440, (Aug. 20-24, 2018), 4 pages.
Nokia et al., "Preconfigured Grant for Uplink transmission", 3GPP TSG RAN WG1 Meeting #94, R1-1811074, (Oct. 8-12, 2018), 6 pages.
Nokia et al., "Signaling Aspects for transmission in preconfigured resources", 3GPP TSG RAN WG2 Meeting #103bis, R2-1814413, (Oct. 8-12, 2018), 2 pages.
Nokia et al., "Signaling Aspects for transmission in preconfigured resources", 3GPP TSG RAN WG2 Meeting #104, R2-1817043, (Nov. 12-16, 2018), 5 pages.
Office Action for Algerian Application No. DZ/P/2023/1654 dated Mar. 24, 2024, 2 pages.
Office Action for Japanese Application No. 2023-559829 dated Sep. 2, 2024, 11 pages.
Qualcomm, "Summary of Other RRC-MAC-PHY interactions", 3GPP TSG-RAN WG1 Meeting #109-e, R2-2002021, (Feb. 24-Mar. 6, 2020), 12 pages.
Sierra Wireless, "LTE-M Pre-configured UL Resources Design Considerations", 3GPP TSG RAN WG1 Meeting #95, R1-1812724, (Nov. 12-16, 2018), 11 pages.
ZTE Corporation et al., "Control plane aspects of SDT", 3GPP TSG-RAN2 #112e, R2-2009190, (Nov. 2-13, 2020), 11 pages.
ZTE Corporation et al., "Corrections on the actions of sidelink measurement configuration in TS 38.331", 3GPP TSG-RAN WG2 Meeting #113-e, R1-2100501, (Jan. 25-Feb. 5, 2021), 3 pages.
ZTE Corporation et al., "MAC-RRC coordination for TA validation and some FFS for D-PUR", 3GPP TSG-RAN WG2 Meeting #109 electronic, R2-2001200, (Feb. 24-Mar. 6, 2020), 15 pages.
ZTE Corporation, "Work Item on NR smalldata transmissions in INACTIVE state", 3GPP TSG RAN Meeting #86, RP-193252, (Dec. 9-12, 2019), 4 pages.
ZTE, "Support for transmission in preconfigured UL resources for MTC", 3GPP TSG RAN WG1 Meeting #95, R1-1812765, (Nov. 12-16, 2018), 7 pages.
ZTE, "Support for transmission in preconfigured UL resources for MTC", 3GPP TSG RAN WG1 Meeting #96bis, R1-1904343, (Apr. 8-12, 2019), 12 pages.
Decision to Grant for Japanese Application No. 2023-559829 dated Dec. 5, 2024, 5 pages.
Office Action for European Application No. 21933674.0 dated Dec. 19, 2025, 5 pages.
Lenovo et al., "Consideration on CG based small data transmission", 3GPP TSG-RAN WG2 Meeting #112 electronic, R2-2009874, (Nov. 2-13, 2020), 4 pages.
Office Action for ARIPO Application No. AP/P/2023/015198 dated Nov. 24, 2025, 5 pages.
Office Action for Korean Application No. 10-2023-7036597 dated Oct. 14, 2025, 15 pages.
Decision to Grant for ARIPO Application No. AP/P/2023/015198 dated Feb. 25, 2026, 6 pages.
Office Action for Mexican Application No. MX/A/2023/011445 dated Jan. 28, 2026, 8 pages.
Office Action for Singapore Application No. 11202307194S dated Feb. 26, 2026, 11 pages.
Decision to Grant for European Application No. 21933674.0 dated Mar. 26, 2026, 2 pages.
Notice of Allowance for Mexican Application No. MX/a/2023/011445 dated May 27, 2026, 6 pages.
Office Action for Colombian Application No. NC2023/0014657 dated Jun. 25, 2026, 38 pages.
Office Action for Malaysian Application No. PI 2023005901 dated Aug. 13, 2026, 3 pages.

* cited by examiner

MECHANISM FOR CONFIGURED GRANT TRANSMISSION

CROSS-REFERENCE TO RELATED APPLICATIONS

This application is a national phase entry of International Application No. PCT/CN2021/084123, filed Mar. 30, 2021, the contents of which are hereby incorporated by reference in their entirety.

FIELD

Embodiments of the present disclosure generally relate to communication techniques, and more particularly, to methods, devices and computer readable medium for configured grant transmissions.

BACKGROUND

With developments of communication systems, new technologies have been proposed. For example, to increase the utilization ratio of periodically allocated resources, the communication system may enable multiple devices to share the periodic resources allocated with a configured grant (CG) mechanism. The base station allocates the configured grant resources to multiple terminal devices, and the terminal devices utilize the resources when they have data to transmit. By assigning the configured grant resources, the communication system eliminates the packet transmission delay due to a scheduling request procedure.

SUMMARY

Generally, embodiments of the present disclosure relate to a method for configured grant transmissions and corresponding devices.

In a first aspect, there is provided a first device. The first device comprises at least one processor; and at least one memory including computer program codes; the at least one memory and the computer program codes are configured to, with the at least one processor, cause the first device to receive a resource configuration of configured grant, CG, transmission from a second device; determine whether a timing advance is valid in a subsequent CG occasion for a small data transmission based on a first timer and the resource configuration; and perform the small data transmission in the subsequent CG occasion based on the determination.

In a second aspect, there is provided a second device. The second device comprises at least one processor; and at least one memory including computer program codes; the at least one memory and the computer program codes are configured to, with the at least one processor, cause the second device to transmit a resource configuration of configured grant, CG, transmission to a second device; and in accordance with a determination that a timing advance is valid in a subsequent CG occasion for a small data transmission, receive the small data transmission in the subsequent CG occasion.

In a third aspect, there is provided a method. The method comprises receiving, at a first device, a resource configuration of configured grant, CG, transmission from a second device. The method also comprises determining whether a timing advance is valid in a subsequent CG occasion for a small data transmission based on a first timer and the resource configuration. The method further comprises performing the small data transmission in the subsequent CG occasion based on the determination.

In a fourth aspect, there is provided a method. The method comprises transmitting, at a second device, a resource configuration of configured grant, CG, transmission to a second device. The method further comprises in accordance with a determination that a timing advance is valid in a subsequent CG occasion for a small data transmission, receiving the small data transmission in the subsequent CG occasion.

In a fifth aspect, there is provided an apparatus. The apparatus comprises means for receiving, at a first device, a resource configuration of configured grant, CG, transmission from a second device; means for determining whether a timing advance is valid in a subsequent CG occasion for a small data transmission based on a first timer and the resource configuration; and means for performing the small data transmission in the subsequent CG occasion based on the determination.

In a sixth aspect, there is provided an apparatus. The apparatus comprises means for transmitting, at a second device, a resource configuration of configured grant, CG, transmission to a second device; and means for in accordance with a determination that a timing advance is valid in a subsequent CG occasion for a small data transmission, receiving the small data transmission in the subsequent CG occasion.

In a seventh aspect, there is provided a computer readable medium comprising program instructions for causing an apparatus to perform at least the method according to the above third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
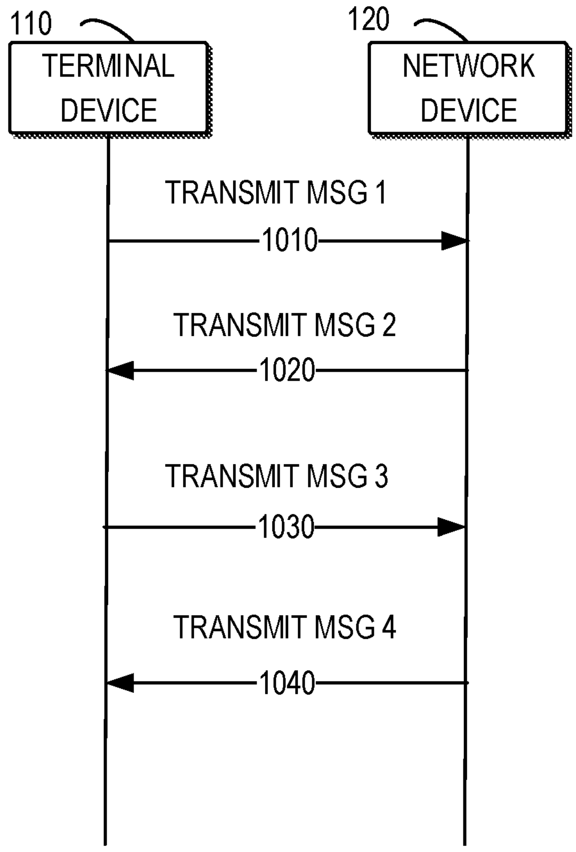
FIGS. 1A-1C illustrates schematic diagrams of small stat transmission (SDT) solutions, respectively.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IOT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, the configured grant (CG) based uplink transmission has been proposed. According to some technologies, small data transmission can be supported. FIG. 1A shows a schematic diagram of interactions for 4-step random access channel (RACH) based SDT (i.e. 4-step RA-SDT). As shown in FIG. 1A, a terminal device 110 can transmit 1010 a message 1 (MSG 1) to a network device 120 when the terminal device 110 is in a radio resource control (RRC) inactive state. The MSG 1 comprises a preamble for the RACH. The network device 120 can transmit 1020 a message 2 (MSG 2) to the terminal device 110. The MSG 2 comprises a random access response. The terminal device 110 can transmit 1030 a message 3 (MSG 3) to the network device 120. The MSG 3 comprises a RRC connection resume request. A small payload (i.e., the small data) can be transmitted in the MSG 3. For example, the small payload can be multiplexed with the RRC connection resume request. The network device 120 can transmit 1040 a RRC release message.

Figure 1B:
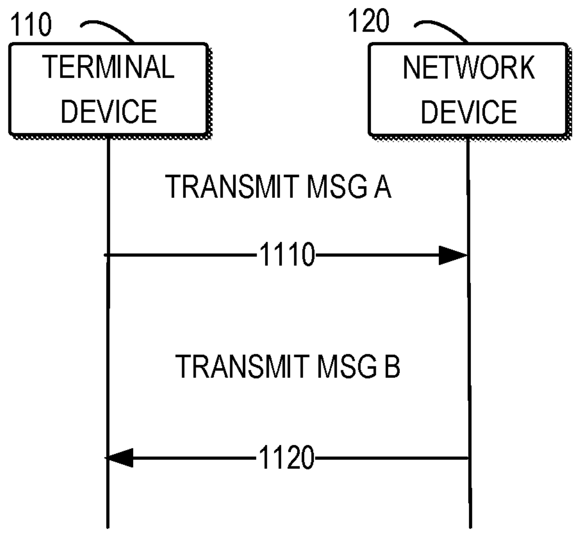

FIG. 1B shows a schematic diagram of interactions for 2-step RACH based SDT (i.e. 2-step RA-SDT). As shown in FIG. 1B, when the terminal device 110 is in the RRC inactive state, the terminal device 110 transmits 1110 a message A (MSG A) to the network device 120. The MSG A can comprise a preamble for the RACH. The small data can be transmitted with the MSG A. In particular, the small data can be transmitted on physical uplink shared channel (PUSCH) resources that are pre-configured by the network device 120 and are broadcasted in system information with associated physical transmission parameters. The network device 120 transmits 1120 a message B (MSG B) to the terminal device 110. The MSG B comprises a random access response.

Figure 1C:
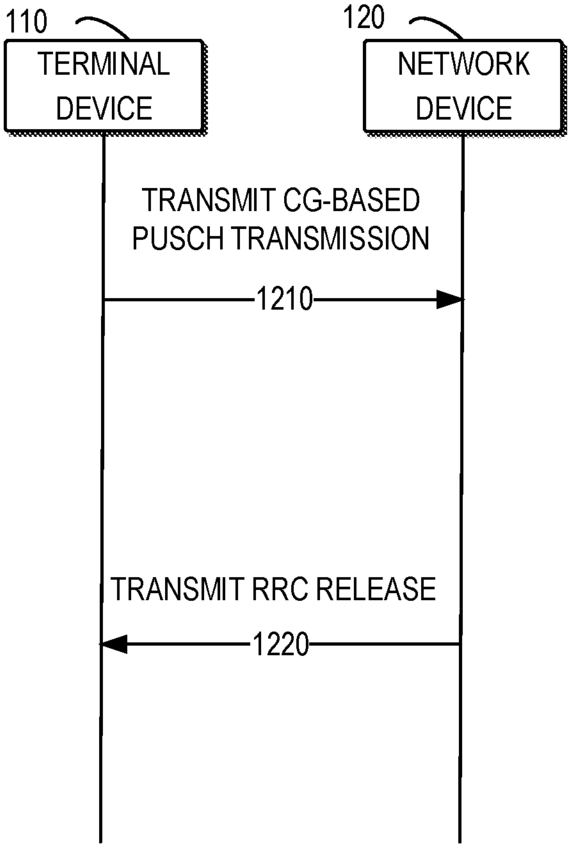

FIG. 1C shows a schematic diagram of interactions for Configured Grant based SDT (i.e. CG-SDT). When the terminal device 110 is in a RRC Connected state, the terminal device 110 can receive 1210 a CG type1 configuration that indicates specific pre-configured PUSCH resources to be used for UL data transmission in RRC Inactive as long as the timing alignment is valid. The network device 120 can transmit 1220 a RRC release message.

In wireless systems, it is required to adjust a timing of an uplink frame in order to have alignment with a downlink frame in time domain. According to some conventional technologies, the timing advance (TA) value corresponds to the length of time a signal takes to reach the network device from the terminal device. The timing advance adjustment can take place both during the RACH procedure (for example, via the Timing Advance Command) and during a normal operation of the terminal device in RRC Connected state. The term "timing advance command (TAC)" used herein can refer to a command sent by a network device to a terminal device to adjust its current timing advance to apply to an uplink transmission. This means that the terminal device performs a transmission to the network associated to a given UL frame a certain amount of UL symbols in advance to the corresponding DL frame according to the received command. This is applied for e.g. PUSCH, physical uplink control channel (PUCCH) and sounding reference signal (SRS) transmission. Basically, the TAC can inform the terminal device the amount of time that the terminal device needs to advance the UL transmissions.

According to some conventional technologies, CG-SDT selection is prioritized compared to Random Access based SDT (i.e. RA-SDT). However, the terminal device is required to perform several (sequential) evaluations before being able to select the CG-SDT transmission type and a CG-SDT resource to make an UL data transmission when in the RRC Inactive state.

In some embodiments, the terminal device may likely initiate an evaluation procedure shortly after a data arrival in its buffer to minimize a delay for the selection of the transmission type (e.g. selection between CG-SDT and RA-SDT types). For example, this is beneficial because the reference signal received power (RSRP)-based evaluations included in the procedure may require to perform new RSRP measurements at the next available SSB transmission occasion(s). Additionally, if an outcome of the CG-SDT selection is not successful, the evaluation may need to continue to determine whether 2-step RA-SDT or 2-step RA-SDT could be selected instead, which would consume further time.

However, if the terminal device performs the evaluation procedure shortly after the data arrival but the CG-periodicity value, configured for the CG resource that is selected for the CG-SDT transmission, is large (e.g. 160-640 ms), this implies that there may be a certain delay (e.g. up to 640 ms) between the time when the next occurrence of the selected CG resource is available and the time when the UE made the CG-resource selection.

In order to solve at least part of the above problems and other potential problems, solutions on configured grant transmissions are proposed. According to embodiments of the present disclosure, if a small data transmission is needed, a first device determines whether a timing advance is valid in a subsequent CG occasion for the small data transmission. The first device also determines whether an evaluation of a validity condition is applicable in the subsequent CG occasion for the small data transmission. If the timing advance is valid and the evaluation is applicable, the first device performs the small data transmission in the subsequent CG occasion. In this way, the first device is able to perform the evaluation of the validity condition in advance, thereby reducing delays and avoiding failures.

Figure 2:
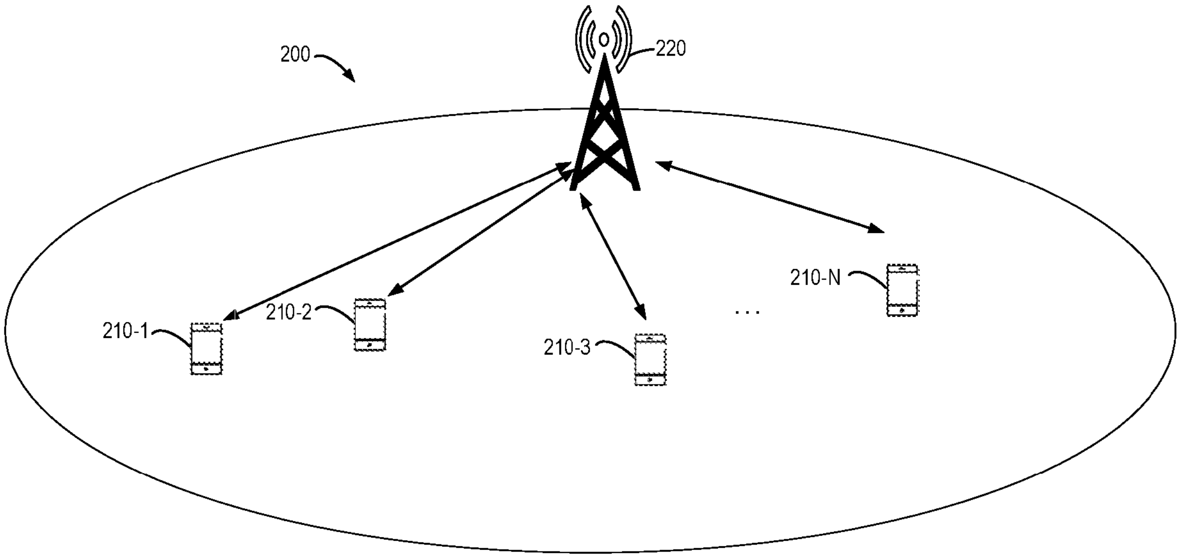
FIG. 2 illustrates a schematic diagram of a communication system according to according to embodiments of the present disclosure.

FIG. 2 illustrates a schematic diagram of a communication system in which embodiments of the present disclosure can be implemented. The communication system 200, which is a part of a communication network, comprises a first device 210-1, a first device 210-2, a first device 210-3 . . . , a first device 210-N, which can be collectively referred to as "first device(s) 210." The communication system 200 further comprises a second device 220. It is to be understood that the number of devices shown in FIG. 2 is given for the purpose of illustration without suggesting any limitations. The communication system 200 may comprise any suitable number of devices and cells. In the communication system 200, the first device 210 and the second device 220 can communicate data and control information to each other. In the case that the first device 210 is the terminal device and the second device 220 is the network device, a link from the second device 220 to the first device 210 is referred to as a downlink (DL), while a link from the first device 210 to the second device 220 is referred to as an uplink (UL). The number of devices shown in FIG. 2 is given for the purpose of illustration without suggesting any limitations.

Communications in the communication system 200 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Example embodiments of the present disclosure will be described in detail below with reference to the accompanying drawings. Reference is now made to FIG. 2, which illustrates a signaling flow 200 according to example embodiments of the present disclosure. Only for the purpose of illustrations, the signaling flow 200 involves the first device 210-1 and the second device 220.

The second device 220 transmits 3005 a resource configuration of configured grant (CG) transmission to the first device 210-1. The term "configured grant transmission" used herein can refer to a transmission without dynamic grant. For example, there can be two types of transmission without dynamic grant, configured grant type 1 and configured grant type 2. For configured grant type 1, an uplink grant can be provided by RRC signaling and stored as configured uplink grant. For configured grant type 2, an uplink grant can be provided by e.g. PDCCH and stored or cleared as configured uplink grant based on physical layer signal (e.g. PDCCH DCI) indicating configured activation or deactivation. In some embodiments, the resource configuration can be transmitted in RRC signaling. Alternatively, the resource configuration can be transmitted in PDCCH signaling.

Figure 4:
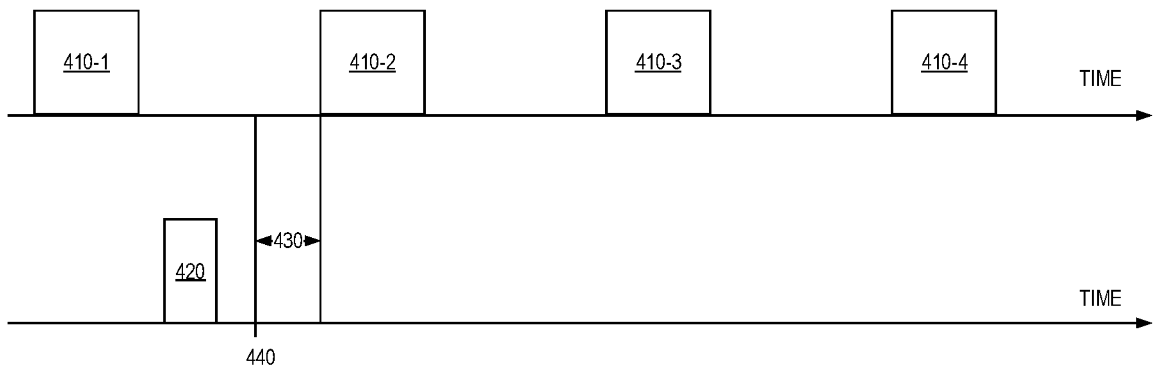
FIG. 4 illustrates a schematic diagram of a configured grant configuration according to embodiments of the present disclosure.

Both type 1 and type 2 can be configured per serving cell and per bandwidth part (BWP). For type 2 grant, activation and deactivation can be independent among the serving cells. When the configured grant type 1 is used, the resource configuration can include one or more of following parameters: a configured scheduling radio network temporary identifier (CS-RNTI) for retransmission; periodicity of the configured grant type 1; an offset of a resource with respect to a system frame number in time domain; time-domain parameters which include a start symbol and a length of an assignment; and the number of hybrid automatically repeat request (HARQ) processes. Alternatively, when the configured grant type 2 is going to be used, the resource configuration can include one or more of following parameters: a CS-RNTI for activation, deactivation, and retransmission; the periodicity of the configured grant type 2; and the number of HARQ processes. FIG. 4 shows an example of the configuration of the CG transmission. As shown in FIG. 4, there are a plurality of CG occasions 410-1, 410-2, 410-3, and 410-4. It should be noted that the number of CG occasions shown in FIG. 4 is only an example not limitations. Data can be transmitted during the CG occasions.

In some embodiments, the first device 210-1 can compare a data volume for the generated data with a data volume threshold. For example, if the data volume of the data generated at the time 420 exceeds the data volume threshold, the first device 210-1 can determine that the small data transmission is not applicable to the data generated at the time 420. Alternatively, if the data volume of the data generated at the time 420 is below the data volume threshold, the first device 210-1 can determine that the small data transmission is applicable to the data generated at the time 420. The data volume threshold can be configured by the second device 220. Alternatively, the data volume threshold can be pre-configured. Additionally, the first device 210-1 can determine whether a data radio bearer of the SDT is valid.

Referring back to FIG. 3, the first device 210-1 determines 3010 whether a timing advance is valid in a subsequent CG occasion for small data transmission based on a first timer and the resource configuration. In this way, it can avoid a failure recovery procedure or delay RA-SDT initiation. For example, as shown in FIG. 4, the data for the small data transmission can be generated by the first device 210-1 at time 420. In this situation, the CG occasion 410-2 can be regarded as the subsequent CG occasion.

The first timer can be associated with the timing advance. In some embodiments, the first timer can be a timing advance timer (TAT). For example, the timing advance remains valid when the first timer is running. The timing advance may be no longer valid after the first timer expired. The length/value of the first timer can be configured by the second device 220. Only as an example shown in FIG. 4, the first device 210-1 may determine whether the first timer remains running until the CG occasion 410-2. If the first timer remains running until the CG occasion 410-2, the first device 210-1 can determine that the timing advance is valid in the CG occasion 410-2. Alternatively, if the first timer expires before the CG occasion 410-2, the first device 210-1 can determine that the timing advance is invalid in the CG occasion 410-2.

In some embodiments, if the SDT procedure for the data generated at time 420 is initiated, the first device 210-1 can select SDT type for the data. For example, the first device 210-1 may select CG based or RA based SDT for the data. In this situation, the first device 210-1 can determine whether the timing advance is valid in the subsequent CG occasion during the selection of the SDT type. If the timing advance is valid in the subsequent CG occasion, the first device 210-1 may select CG based SDT. Alternatively, if the timing advance is invalid in the subsequent CG occasion, the first device 210-1 may select RA based SDT.

Alternatively, the first device 210-1 can determine whether the first timer remains running until the subsequent CG occasion plus a configured retransmission timer. The retransmission timer can be configured by the second device 220. In this situation, if the first timer remains running the subsequent CG occasion plus the configured retransmission timer, the second device 220 can determine that the timing advance is valid. Alternatively, if the first timer expires the subsequent CG occasion plus the configured retransmission timer, the second device 220 can determine that the timing advance is invalid.

The first device 210-1 can perform an evaluation of a validity condition. It should be noted that the validity condition can be any suitable condition for the SDT. If the validity condition is met/fulfilled, the CG based SDT can be selected. For example, the first device 210-1 can measure a reference signal received power (RSRP) of the current cell from the second device 220. In this case, the first device 210-1 can compare the measured RSRP with a RSRP threshold. If the measured RSRP exceeds the RSRP threshold, the validation condition is met. In other words, in the case, the evaluation indicates that the validation condition is fulfilled. If the measured RSRP is below the RSRP threshold, the validation condition is not met. In this situation, the evaluation indicates that the validation condition is unfulfilled.

Alternatively or in addition, the first device 210-1 can determine whether a serving beam is valid. For example, the first device 210-1 can measure synchronization signal (SS)

RSRP on the serving beam. In this case, the first device 210-1 can compare the measured SS-RSRP with a SS-RSRP threshold. If the measured SS-RSRP exceeds the SS-RSRP threshold, the validation condition is met. In other words, in the case, the evaluation indicates that the validation condition is fulfilled. If the measured SS-RSRP is below the SS-RSRP threshold, the validation condition is not met. In this situation, the evaluation indicates that the validation condition is unfulfilled.

In other embodiments, the validity condition can comprise a RSRP based TA validity condition. For example, the first device 210-1 can determine a change in the SS RSRP. In this case, the first device 210-1 can compare the change in the SS-RSRP with a change threshold. The change threshold can comprise an increase threshold or a decrease threshold. If the change in the SS-RSRP exceeds the change threshold, the validation condition is met. In other words, in the case, the evaluation indicates that the validation condition is fulfilled. If the change in the SS-RSRP is below the change threshold, the validation condition is not met. In this situation, the evaluation indicates that the validation condition is unfulfilled.

The evaluation of the validity condition can be performed at any suitable time. In some embodiments, the first device 210-1 can optimize a timing of performing the evaluation of the validity condition based on a second timer (i.e., the validity timer) and a timing of the subsequent CG occasion. For example, the first device 210-1 can perform the evaluation of the validity condition prior to the subsequent CG occasion by a time offset. As shown in FIG. 4, the first device 210-1 can perform the evaluation at time 440 which is prior to the CG occasion 410-2 by the time offset 430. In some embodiments, the time offset can be the minimum time requirement for performing the evaluation of the validity condition. It should be noted that the time offset can be any suitable value. Embodiments of the present disclosure are not limited to this aspect.

Alternatively or in addition, the first device 210-1 can determine 3015 whether an evaluation of a validity condition is applicable in the subsequent CG occasion based on a second timer and the resource configuration. The first device 210-1 can apply the second timer to the evaluation of the validity condition applicable to CG-SDT. In other words, the evaluation (i.e., the validity condition fulfilled/note fulfilled) may remain valid for a certain period after the evaluation is performed according to the second timer. For example, as shown in FIG. 4, the first device 210-1 can perform the evaluation before the occasion 410-2 and the first device 210-1 can determine whether the evaluation of the validity condition remains applicable in the CG occasion 410-2.

In some embodiments, the second timer can be applied to any RSRP based validity condition. For example, the second timer can be applied to an RSRP-based beam validity condition.

The second timer can be configured by the second device 220. For example, the second device 220 can transmit a configuration of the second timer which indicates a length of the second timer. Alternatively, the second timer can be pre-configured. For example, the second timer can be a default timer which is configured previously. In other embodiments, the second timer may not be applied by the first device 210-1.

Alternatively, the second timer can be determined based on a subcarrier spacing (SCS) used for a BWP in which the CG resources are configured. In some embodiments, considering the RSRP-based condition for TA validation, this relies on the lack of a significant change in the RSRP values. The TA may not become invalid during the second timer as long as the first device 210-1 does not move further than a threshold distance. In this case, the threshold distance can be relative to the SCS. Only as an example, if a SCS is 120 KHz, the threshold distance can be 9 m, which corresponds to the TA adjustment spatial granularity of 120 KHz SCS (as shown in Table 1 below), where $T_c$ and μ are respectively the basic time unit for new radio (NR) and the subcarrier spacing configuration.

TABLE 1

| μ | SCS [kHz] | TA Adjustment Granularity $(16 \cdot 64 \cdot T_c/2^\mu)$ [s] | TA Spatial granularity $(16 \cdot 64 \cdot T_c/2 \cdot c \cdot 2^\mu)$ [m] |
|---|---|---|---|
| 0 | 15 | 5.2083e−07 | 78.0705 |
| 1 | 30 | 2.6042e−07 | 39.0352 |
| 2 | 60 | 1.3021e−07 | 19.5176 |
| 3 | 120 | 6.5104e−08 | 9.7588 |
| 4 | 240 | 3.2552e−08 | 4.8794 |

If the first device 210-1 moves at 50 km/h (i.e., 13.8 m/s), the first device 210-1 may travel about 9 m in about 640 ms. Thereby, the second timer which is up to 640 ms can be used for low/medium mobile UEs, if the part of the TA spatial granularity that may have already been consumed is not accounted. In some example embodiments, the second timer can depend on a difference between the observed RSRP change and the change threshold computed at the time the RSRP-based validation is made. In one example, the second timer can be scaled based on the difference between the observed RSRP change and the change threshold computed at the time the RSRP-based validation is made. Only as an example, assuming that the second timer is 640 ms, the change in RSRP is 2 dB, an allowed change window is 5 dB which equals to the increase threshold plus the decrease threshold, a remaining allowed change window is 3 dB which equals to the allowed change window minus the change in RSRP, the scaled second timer can be based on the second timer, the allowed change window and the remaining allowed change window. In this case, the scaled second timer can be 640 ms*(3 dB/5 dB) which equals to 384 ms.

Alternatively, the second timer can be configured if a high SCS is used for the BWP in which the CG resources are configured and no timer is configured if a low SCS is used. For example, if the SCS is higher than 60 kHz, the second timer can be configured. Alternatively, if the SCS is lower than 60 kHz, the second timer may not be configured.

In some embodiments, the first device 210-1 can perform a reevaluation of the validity condition after the second timer expires. In this case, if the reevaluation indicates that the validity condition is not met, the first device 210-1 can start RA based SDT. Alternatively, if the reevaluation indicates that the validity condition is met, the first device 210-1 can start the second timer.

The first device 210-1 performs the small data transmission based on the determination regarding whether the timing advance is valid in the subsequent CG occasion. In some embodiments, if the timing advance is valid, the first device 210-1 can perform 3020 the small data transmission in the subsequent CG occasion. For example, if the timing advance is valid in the subsequent CG occasion and the evaluation of the validity condition is applicable in the subsequent CG occasion, the first device 210-1 can initiate CG-SDT in subsequent CG occasion. Alternatively, if the timing advance is invalid in the subsequent CG occasion, the first device 210-1 can perform 3025 the small data transmission in a random access (RA) procedure. For example, if the condition for RA-SDT is fulfilled, the small data transmission can be performed in the RA procedure. In other embodiments, if the timing advance is invalid, the first device 210-1 can perform 3030 non-small data transmission. For example, if the condition for RA-SDT is not fulfilled, the non small data transmission can be performed. In some embodiments, the the small data transmission can be performed based on a data volume. Alternatively, the small data transmission can be performed based on a reference signal received power.

Embodiments of the present disclosure enable the UE performing the validity condition evaluation in advance. In this way, it can reduce delays and avoid failure scenarios.

Figure 5:
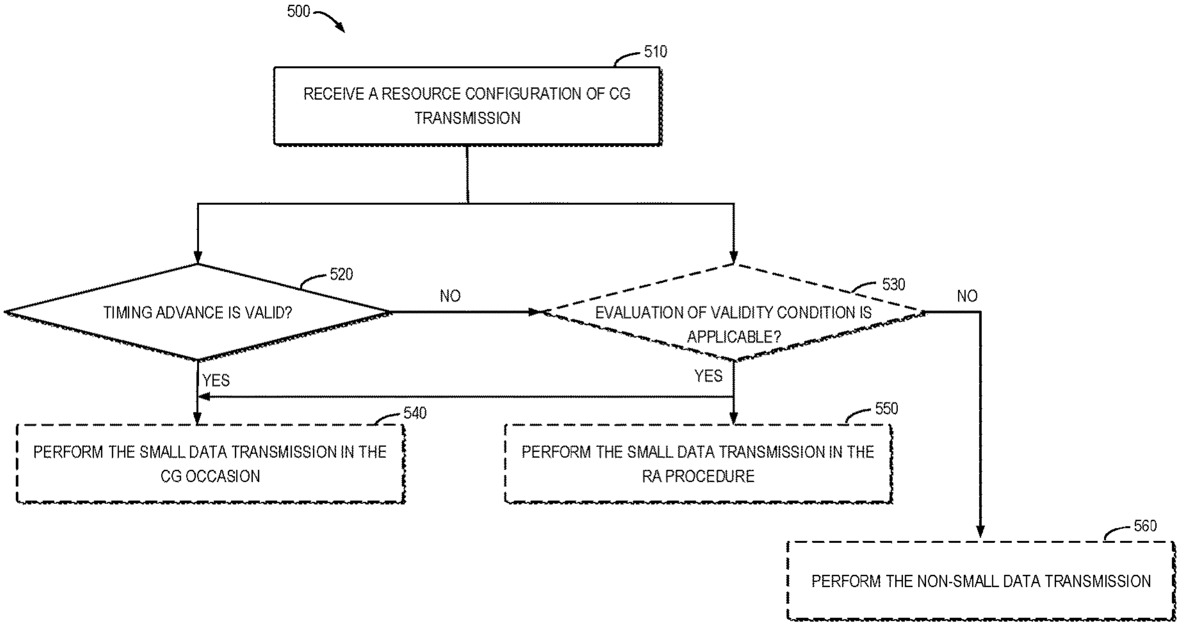
FIG. 5 illustrates a flow chart of a method according to embodiments of the present disclosure.

FIG. 5 illustrates a flow chart of method 500 according to embodiments of the present disclosure. The method 500 can be implemented at any suitable devices. For example, the method may be implemented at the first device 210-1.

At block 510, the first device 210-1 receives a resource configuration of CG transmission from the second device 220. For example, there can be two types of transmission without dynamic grant, configured grant type 1 and configured grant type 2. For configured grant type 1, an uplink grant can be provided by RRC signaling and stored as configured uplink grant. For configured grant type 2, an uplink grant can be provided by PDCCH and stored or cleared as configured uplink grant based on physical layer signal indicating configured activation or deactivation. In some embodiments, the resource configuration can be transmitted in RRC signaling. Alternatively, the resource configuration can be transmitted in PDCCH signaling.

In some embodiments, the first device 210-1 can compare a data volume for the generated data with a data volume threshold. For example, if the data volume of the generated data exceeds the data volume threshold, the first device 210-1 can determine that the small data transmission is not applicable to the generated data. Alternatively, if the data volume of the generated data is below the data volume threshold, the first device 210-1 can determine that the small data transmission is applicable to the generated data. The data volume threshold can be configured by the second device 220. Alternatively, the data volume threshold can be pre-configured. Additionally, the first device 210-1 can determine whether a data radio bearer of the SDT is valid.

At block 520, the first device 210-1 determines whether a timing advance is valid in a subsequent CG occasion for small data transmission based on a first timer and the resource configuration. In this way, it can avoid a failure recovery procedure or delay RA-SDT initiation.

The first timer can be associated with the timing advance. For example, the timing advance remains valid when the first timer is running. The timing advance may be no longer valid after the first timer expired. The length/value of the first timer can be configured by the second device 220.

Alternatively, the first device 210-1 can determine whether the first timer remains running until the subsequent CG occasion plus a configured retransmission timer. The retransmission timer can be configured by the second device 220. In this situation, if the first timer remains running the subsequent CG occasion plus the configured retransmission timer, the second device 220 can determine that the timing advance is valid. Alternatively, if the first timer expires the subsequent CG occasion plus the configured retransmission timer, the second device 220 can determine that the timing advance is invalid.

In some embodiments, the first device 210-1 can perform an evaluation of a validity condition. It should be noted that the validity condition can be any suitable condition for the SDT. If the validity condition is met/fulfilled, the CG based SDT can be selected. For example, the first device 210-1 can measure a reference signal received power (RSRP) of the current cell from the second device 220. In this case, the first device 210-1 can compare the measured RSRP with a RSRP threshold. If the measured RSRP exceeds the RSRP threshold, the validation condition is met. In other words, in the case, the evaluation indicates that the validation condition is fulfilled. If the measured RSRP is below the RSRP threshold, the validation condition is not met. In this situation, the evaluation indicates that the validation condition is unfulfilled.

Alternatively or in addition, the first device 210-1 can determine whether a serving beam is valid. For example, the first device 210-1 can measure synchronization signal (SS) RSRP on the serving beam. In this case, the first device 210-1 can compare the measured SS-RSRP with a SS-RSRP threshold. If the measured SS-RSRP exceeds the SS-RSRP threshold, the validation condition is met. In other words, in the case, the evaluation indicates that the validation condition is fulfilled. If the measured SS-RSRP is below the SS-RSRP threshold, the validation condition is not met. In this situation, the evaluation indicates that the validation condition is unfulfilled.

In other embodiments, the validity condition can comprise a RSRP based TA validity condition. For example, the first device 210-1 can determine a change in the SS RSRP. In this case, the first device 210-1 can compare the change in the SS-RSRP with a change threshold. The change threshold can comprise an increase threshold or a decrease threshold. If the change in the SS-RSRP exceeds the change threshold, the validation condition is met. In other words, in the case, the evaluation indicates that the validation condition is fulfilled. If the change in the SS-RSRP is below the change threshold, the validation condition is not met. In this situation, the evaluation indicates that the validation condition is unfulfilled.

The evaluation of the validity condition can be performed at any suitable time. In some embodiments, the first device 210-1 can optimize a timing of performing the evaluation of the validity condition based on a second timer (i.e., the validity timer) and a timing of the subsequent CG occasion. For example, the first device 210-1 can perform the evaluation of the validity condition prior to the subsequent CG occasion by a time offset. In some embodiments, the time offset can be the minimum time requirement for performing the evaluation of the validity condition. It should be noted that the time offset can be any suitable value. Embodiments of the present disclosure are not limited to this aspect.

In some embodiments, at block 530, the first device 210-1 can determine whether an evaluation of a validity condition is applicable in the subsequent CG occasion based on a second timer and the resource configuration. The first device 210-1 can apply the second timer to the evaluation of the validity condition applicable to CG-SDT. In other words, the evaluation (i.e., the validity condition fulfilled/note fulfilled) may remain valid for a certain period after the evaluation is performed according to the second timer.

In some embodiments, the second timer can be applied to any RSRP based validity condition. For example, the second timer can be applied to an RSRP-based beam validity condition or a RSRP-based TA validity condition.

The second timer can be configured by the second device 220. For example, the second device 220 can transmit a configuration of the second timer which indicates a length of the second timer. Alternatively, the second timer can be pre-configured. For example, the second timer can be a default timer which is configured previously. In other embodiments, the second timer may not be applied by the first device 210-1.

Alternatively, the second timer can be determined based on a subcarrier spacing (SCS) used for a BWP in which the CG resources are configured. In some embodiments, considering the RSRP-based condition for TA validation, this relies on the lack of a significant change in the RSRP values. The TA may not become invalid during the second timer as long as the first device 210-1 does not move further than a threshold distance. In this case, the threshold distance can be relative to the SCS. Alternatively, the second timer can be configured if a high SCS is used for the BWP in which the CG resources are configured and no timer is configured if a low SCS is used.

In some embodiments, the first device 210-1 can perform a reevaluation of the validity condition after the second timer expires. In this case, if the reevaluation indicates that the validity condition is not met, the first device 210-1 can start RA based SDT. Alternatively, if the reevaluation indicates that the validity condition is met, the first device 210-1 can start the second timer.

The first device 210-1 performs the small data transmission based on the determination regarding whether the timing advance is valid in the subsequent CG occasion. In some embodiments, if the timing advance is valid, the first device 210-1 can, at block 540, perform the small data transmission in the subsequent CG occasion. For example, if the timing advance is valid in the subsequent CG occasion and the evaluation of the validity condition is applicable in the subsequent CG occasion, the first device 210-1 can initiate CG-SDT in subsequent CG occasion. Alternatively, if the if the timing advance is invalid in the subsequent CG occasion and the evaluation which indicates that the validity condition is fulfilled is applicable in the subsequent CG occasion, at block 550, the first device 210-1 can perform the small data transmission in a random access procedure. In other embodiments, if the timing advance is invalid and the evaluation is inapplicable in the subsequent CG occasion, the first device 210-1 can perform non-small data transmission at block 560.

Figure 6:
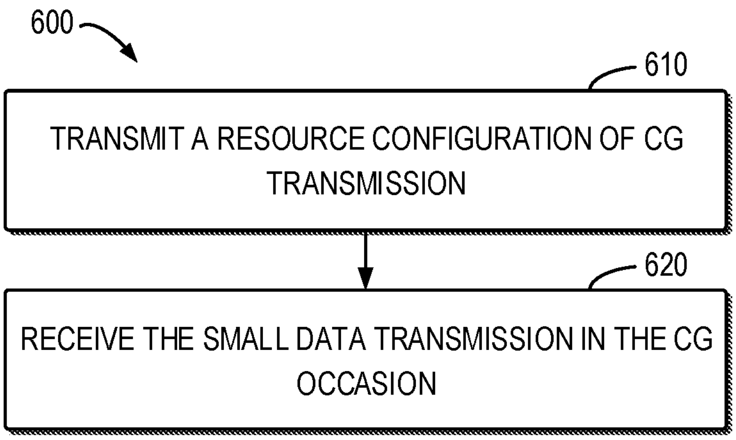
FIG. 6 illustrates a flow chart of a method according to embodiments of the present disclosure.

FIG. 6 illustrates a flow chart of method 600 according to embodiments of the present disclosure. The method 600 can be implemented at any suitable devices. For example, the method may be implemented at the second device 220.

At block 610, the second device 220 transmits a resource configuration of configured grant (CG) transmission to the first device 210-1. The term "configured grant transmission" used herein can refer to a transmission without dynamic grant. For example, there can be two types of transmission without dynamic grant, configured grant type 1 and configured grant type 2. For configured grant type 1, an uplink grant can be provided by RRC signaling and stored as configured uplink grant. For configured grant type 2, an uplink grant can be provided by PDCCH and stored or cleared as configured uplink grant based on physical layer signal indicating configured activation or deactivation. In some embodiments, the resource configuration can be transmitted in RRC signaling. Alternatively, the resource configuration can be transmitted in PDCCH signaling.

At block 620, if the timing advance is valid in a subsequent CG occasion for a small data transmission, the second device 220 receives the small data transmission in the subsequent CG occasion. In some embodiments, the second device 220 can transmit to the first device 210-1 a configuration indicating a length of a timer for determining whether an evaluation of a validity condition for the small data transmission is applicable in the subsequent CG occasion.

Alternatively, if the timing advance is invalid and the evaluation is applicable, the second device 220 can receive the small data transmission in a random access procedure. In other embodiments, if the timing advance is invalid and the evaluation is inapplicable, the second device 220 can receive a non-small data transmission from the first device.

In some embodiment, after CG-SDT procedure is initiated, the first device 210-1 can perform CG resource validation during the CG-SDT procedure as well. If CG for SDT becomes invalid due to, e.g., TAT for CG-SDT expiry, the beams for CG-SDT become invalid, or RSRP falls below or changed more than configured threshold, etc, the first device 210-1 performs fallback procedure. The fallback procedure can be, e.g., one of RA-SDT procedure, RRC resume procedure, regular RA procedure to request UL resource, or performing actions going to IDLE or RRC Setup Request procedure. In some embodiment, only TAT expiry is checked during the CG-SDT procedure and beam/RSRP criteria is only checked at SDT procedure initation.

In some embodiment, different procedures could be performed depending on at which point in time the CG resource becomes invalid at the SDT procedure, e.g. before or after response from the second device 220 is received. For example, if CG becomes invalid before receiving the second device 220 response to a CG transmission, RA-SDT is performed if there is valid RA-SDT resource available, and otherwise normal RRC resume procedure is performed or the first device 210-1 can perform actions going to IDLE. In one example the data sent via CG can be kept and resent. Alternatively, the first device 210-1 can decode for the whole NW reception window regardless of if the CG becomes invalid before the window expires. If CG becomes invalid after the first device 210-1 received response from the second device 220, one of the following is performed: SDT procedure continues with normal RA procedure performed to request resource (and acquire UL timing in case TAT has expired), or RA-SDT is performed if there is valid RA-SDT resource available, or SDT procedure is stopped and normal resume procedure is performed.

In some embodiment, different procedures could be performed depending on the cause based on which the CG becomes invalid, e.g. RA-SDT is performed if CG resource becomes invalid due to TAT expiry but RSRP is still above the threshold for SDT, or RA-SDT or normal resume procedure to be performed depending on whether RSRP is above threshold for RA-SDT if CG resource becomes invalid due to RSRP below threshold or the configured beams becomes invalid.

In some embodiment, CG configuration for SDT is released or suspended after receiving the response from the second device 220 and subsequent UL transmission(s) relies on dynamic scheduling. It can be reconfigured or resumed with RRC release message when the SDT procedure ends. In some embodiment, CG configuration for SDT is suspended, or suspended for a certain period, or released in case the CG resource becomes invalid during the SDT procedure. In some embodiment, CG configuration for SDT is suspended if invalidated due to criteria other than TAT expiry, e.g. RSRP/beam criteria, and it is released if due to TAT expiry.

In some embodiments, an apparatus for performing the method 500 (for example, the first device 210) may comprise respective means for performing the corresponding steps in the method 500. These means may be implemented in any suitable manners. For example, it can be implemented by circuitry or software modules.

In some embodiments, the apparatus comprises means for receiving, at a first device, a resource configuration of configured grant, CG, transmission from a second device; means for determining whether a timing advance is valid in a subsequent CG occasion for a small data transmission based on a first timer and the resource configuration; and means for performing the small data transmission in the subsequent CG occasion based on the determination.

In some embodiments, the means for determining whether the timing advance is valid comprises: means for determining whether the first timer remains running until the subsequent CG occasion; and means for in accordance with a determination that the first timer remains running until the subsequent CG occasion, determining that the timing advance is valid.

In some embodiments, the means for determining whether the timing advance is valid comprises: means for in accordance with a determination that the small data transmission is initiated, determining whether the timing advance is valid during selecting a transmission type for the small data transmission, the transmission type comprising the CG transmission or a random access (RA) transmission.

In some embodiments, the apparatus comprises means for selecting the transmission type for the small data transmission at the subsequent CG occasion, before the subsequent CG occasion, or when data for the small data transmission is arrived.

In some embodiments, the means for determining whether the timing advance is valid comprises: means for determining whether the first timer remains running until the subsequence CG occasion plus a configured retransmission timer.

In some embodiments, the apparatus further comprises means for determining whether an evaluation of a validity condition for the small data transmission is applicable in the subsequent CG occasion based on a second timer and the resource configuration.

In some embodiments, the validation condition comprises a reference signal received power, RSRP, threshold, and the apparatus further comprises means for means for measuring a RSRP on a reference signal received from the second device; and means for in accordance with a determination that a change of the RSRP exceeds a RSRP change threshold, determining that the validation condition is fulfilled.

In some embodiments, the means for determining the evaluation of the validation condition for the configured grant transmission is applicable comprises: means for performing the evaluation of the validation condition; and means for in accordance with a determination that the second timer is running until the subsequent CG occasion, determining the evaluation of the validation condition is applicable.

In some embodiments, the apparatus further comprises means for performing the evaluation of the validation condition prior to the subsequent CG occasion by a time-offset.

In some embodiments, the time-offset is a minimum time length for processing requirement for the first device to perform the evaluation.

In some embodiments, the apparatus further comprises means for determining a length of the second timer based on at least one of: a configuration of the second timer received from the second device, or a subcarrier spacing used for the CG resources.

In some embodiments, the apparatus further comprises means for in accordance with a determination that the second timer expired, performing a reevaluation of the validity condition.

In some embodiments, the apparatus further comprises means for in accordance with a determination that the timing advance is invalid, performing the small data transmission in a random access procedure.

In some embodiments, the apparatus further comprises means for in accordance with a determination that the timing advance is invalid, initiating a non-small data transmission procedure.

In some embodiments, the means for performing the small data transmission comprise: means for in accordance with a determination that the timing advance is valid and the evaluation of the validity condition for the small data transmission is applicable in the subsequent CG occasion, performing the small data transmission in the subsequent CG occasion.

In some embodiments, the means for performing the small data transmission comprises means for performing the small data transmission in the subsequent configured grant occasion based on the determination and at least one of: a data volume of the small data transmission, or a reference signal received power RSRP.

In embodiments, an apparatus for performing the method 600 (for example, the second device 220) may comprise respective means for performing the corresponding steps in the method 600. These means may be implemented in any suitable manners. For example, it can be implemented by circuitry or software modules.

In some embodiments, the apparatus comprises means for transmitting, at a second device, a resource configuration of configured grant, CG, transmission to a second device; and means for in accordance with a determination that a timing advance is valid in a subsequent CG occasion for a small data transmission, receiving the small data transmission in the subsequent CG occasion.

In some embodiments, the apparatus comprises means for transmitting to the first device a configuration indicating a length of a timer for determining whether an evaluation of a validity condition for the small data transmission is applicable in the subsequent CG occasion.

In some embodiments, the apparatus comprises means for in accordance with a determination that the timing advance is invalid and the evaluation is applicable, receiving the small data transmission in a random access procedure.

In some embodiments, the apparatus comprises means for in accordance with a determination that the timing advance is invalid and the evaluation is inapplicable, receiving a non-small data transmission from the first device.

Figure 7:
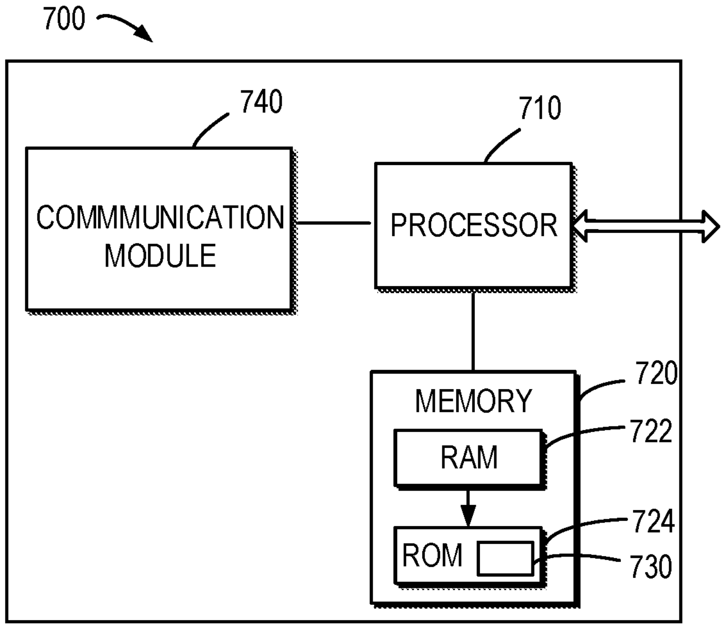
FIG. 7 illustrates a simplified block diagram of an apparatus that is suitable for implementing embodiments of the present disclosure.

FIG. 7 is a simplified block diagram of a device 700 that is suitable for implementing embodiments of the present disclosure. The device 700 may be provided to implement the communication device, for example the terminal device 210, or the network device 220 as shown in FIG. 2. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

Figure 3:
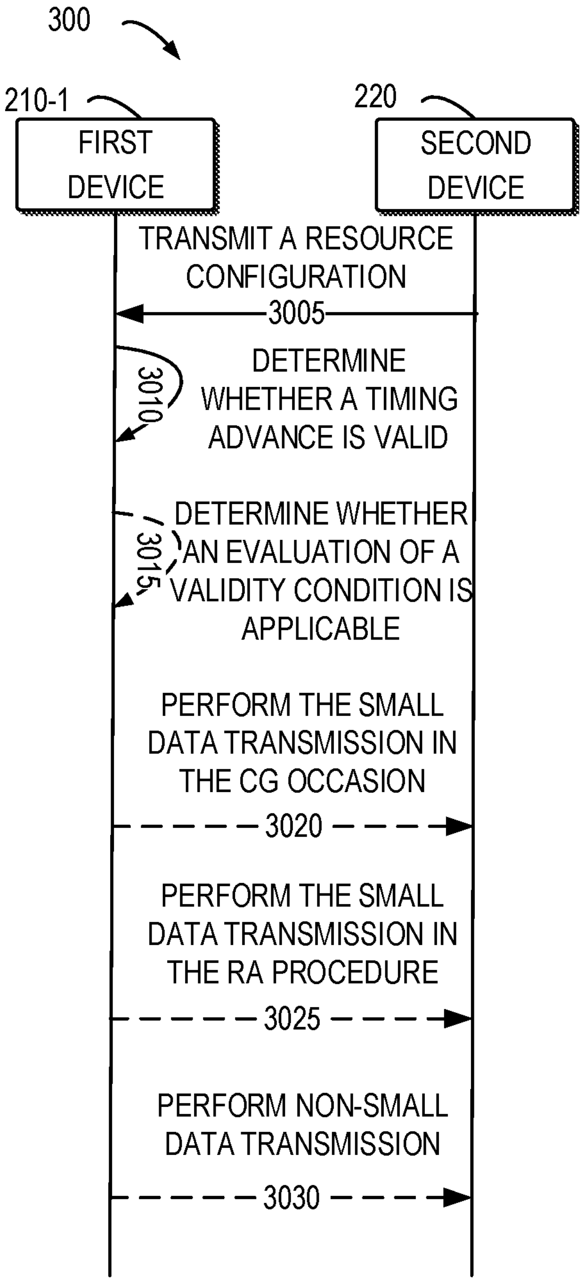
FIG. 3 illustrates a schematic diagram of interactions between devices according to according to embodiments of the present disclosure.

The embodiments of the present disclosure may be implemented by means of the program 720 so that the device 700 may perform any process of the disclosure as discussed with reference to FIGS. 3 and 6. The embodiments of the present disclosure may also be implemented by hardware or by a combination of software and hardware.

Figure 8:
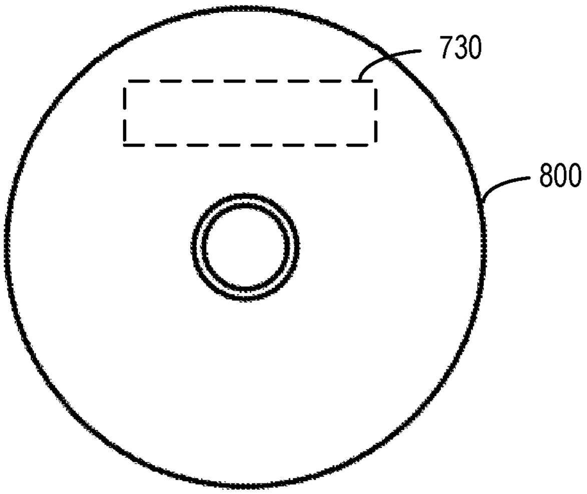
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods as described above with reference to FIGS. 3-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:

at least one processor; and at least one memory comprising program codes stored therein that, when executed by the at least one processor, cause the first device to perform at least:

receiving a resource configuration of configured grant transmission from a second device;

determining whether a timing advance is valid in a subsequent configured grant occasion for a small data transmission based on a time alignment timer and the resource configuration;

performing an evaluation of a reference signal received power (RSRP)-based timing advance validity condition for the small data transmission;

determining whether the evaluation of the RSRP-based timing advance validity condition for the small data transmission is applicable in the subsequent configured grant occasion based on a validity timer and the resource configuration, wherein the evaluation of the RSRP-based timing advance validity condition remains valid for a certain period according to the validity timer after the evaluation of the RSRP-based timing advance validity condition is performed; and in an instance in which the timing advance is valid and the evaluation of the RSRP-based timing advance validity condition for the small data transmission is applicable in the subsequent configured grant occasion, initiating the small data transmission in the subsequent configured grant occasion.

2. The first device of claim 1, wherein the program codes stored in the at least one memory, when executed by the at least one processor, cause the first device to perform the determining whether the timing advance is valid by further causing the first device to perform:

determining whether the time alignment timer remains running until the subsequent configured grant occasion; and in accordance with a determination that the time alignment timer remains running until the subsequent configured grant occasion, determining that the timing advance is valid.

3. The first device of claim 1, wherein the program codes stored in the at least one memory, when executed by the at least one processor, cause the first device to perform the determining whether the timing advance is valid by causing the first device to perform:

in accordance with a determination that the small data transmission is initiated, determining whether the timing advance is valid during selecting a transmission type for the small data transmission, the transmission type comprising one of: the configured grant transmission or a random access transmission.

4. The first device of claim 1, wherein the program codes stored in the at least one memory, when executed by the at least one processor, further cause the first device to perform:

in accordance with a determination that the timing advance is invalid, performing the small data transmission in a random access procedure or initiating a non-small data transmission procedure.

5. The first device of claim 1, wherein the program codes stored in the at least one memory, when executed by the at least one processor, further cause the first device to perform the initiating the small data transmission in the subsequent configured grant occasion based further on at least one of:

a data volume of the small data transmission, or an RSRP.

6. The first device of claim 1, wherein the first device comprises a terminal device and the second device comprises a network device.

7. The first device of claim 1, wherein the validity timer is up to 640 ms.

8. A method comprising:

receiving, at a first device, a resource configuration of configured grant transmission from a second device;

determining, at the first device, whether a timing advance is valid in a subsequent configured grant occasion for a small data transmission based on a time alignment timer and the resource configuration;

performing an evaluation of a reference signal received power (RSRP)-based timing advance validity condition for the small data transmission;

determining whether the evaluation of the RSRP-based timing advance validity condition for the small data transmission is applicable in the subsequent configured grant occasion based on a validity timer and the resource configuration, wherein the evaluation of the RSRP-based timing advance validity condition remains valid for a certain period according to the validity timer after the evaluation of the RSRP-based timing advance validity condition is performed; and in an instance in which the timing advance is valid and the evaluation of the RSRP-based timing advance validity condition for the small data transmission is applicable in the subsequent configured grant occasion, initiating, by the first device, the small data transmission in the subsequent configured grant occasion.

9. The method of claim 8, wherein the determining whether the timing advance is valid comprises:

determining whether the time alignment timer remains running until the subsequent configured grant occasion; and in accordance with a determination that the time alignment timer remains running until the subsequent configured grant occasion, determining that the timing advance is valid.

10. The method of claim 8, wherein the determining whether the timing advance is valid comprises:

in accordance with a determination that the small data transmission is initiated, determining whether the timing advance is valid during selecting a transmission type for the small data transmission, the transmission type comprising one of: the configured grant transmission or a random access transmission.

11. The method of claim 8, further comprising:

in accordance with a determination that the timing advance is invalid, performing, by the first device, the small data transmission in a random access procedure or initiating, by the first device, a non-small data transmission procedure.

12. The method of claim 8, wherein the performing initiating the small data transmission in the subsequent configured grant occasion comprises:

initiating, by the first device, the small data transmission in the subsequent configured grant occasion based further on at least one of:

a data volume of the small data transmission, or an RSRP.

13. The method of claim 8, wherein the first device comprises a terminal device and the second device comprises a network device.

14. The method of claim 8, wherein the validity timer is up to 640 ms.

15. A system comprising a network device and a terminal device, wherein the network device comprises:

at least one processor; and at least one memory comprising program codes stored therein that, when executed by the at least one processor, cause the network device to perform at least:

transmitting a resource configuration of a configured grant transmission to the terminal device; and receiving a small data transmission from the terminal device in a subsequent configured grant occasion, and wherein the terminal device comprises:

at least one processor; and at least one memory comprising program codes stored therein that, when executed by the at least one processor, cause the terminal device to perform at least:

determining whether a timing advance is valid in the subsequent configured grant occasion for a small data transmission based on a time alignment timer and the resource configuration;

performing an evaluation of a reference signal received power (RSRP)-based timing advance validity condition for the small data transmission;

determining whether the evaluation of the RSRP-based timing advance validity condition for the small data transmission is applicable in the subsequent configured grant occasion based on a validity timer and the resource configuration, wherein the evaluation of the RSRP-based timing advance validity condition remains valid for a certain period according to the validity timer after the evaluation of the RSRP-based timing advance validity condition is performed; and in an instance in which the timing advance is valid and the evaluation of the RSRP-based timing advance validity condition for the small data transmission is applicable in the subsequent configured grant occasion, initiating the small data transmission in the subsequent configured grant occasion.

16. The system of claim 15, wherein the validity timer is up to 640 ms.

* * * * *